Sept. 27, 1927.
H. W. LUTES
1,643,388
AUTOMOBILE WHEEL BRAKE
Filed March 25, 1927
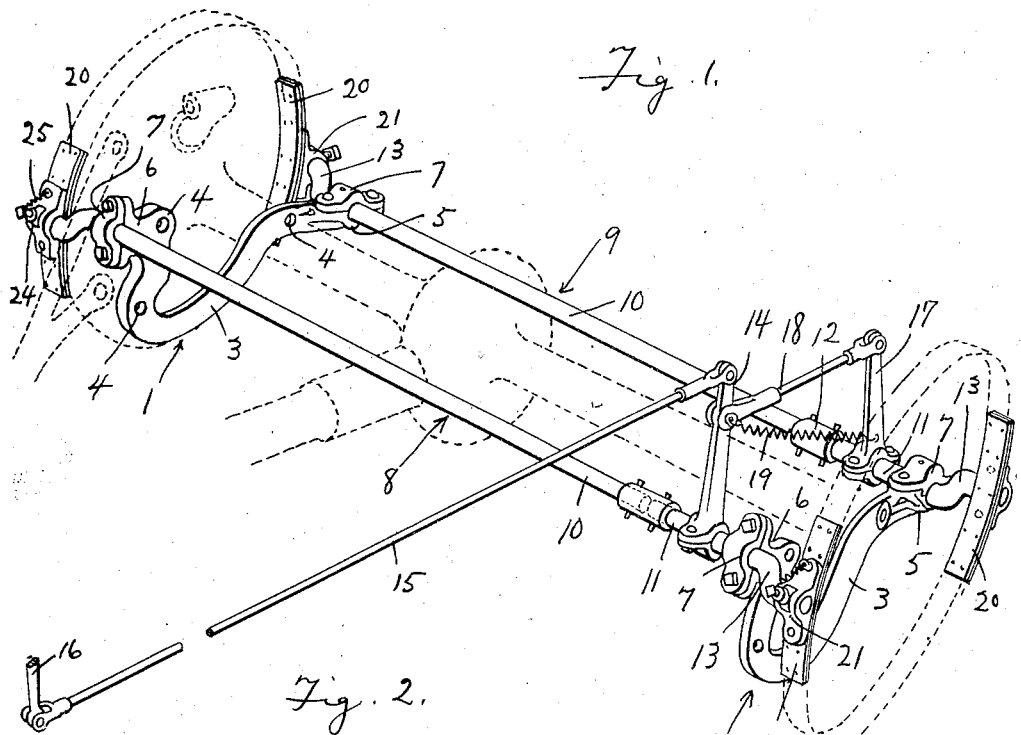
Inventor
*Henry W. Lutes*
By *Clarence A. O'Brien*
Attorney Patented Sept. 27, 1927.

1,643,388

UNITED STATES PATENT OFFICE.

HENRY W. LUTES, OF ROSCOE, MISSOURI.

AUTOMOBILE WHEEL BRAKE.

Application filed March 25, 1927. Serial No. 178,324.

The present invention relates to an improved automobile wheel brake which is especially, although not necessarily, adapted for use upon Ford trucks and pleasure cars.

My primary aim is to generally improve upon brake structures of this class by providing one of the external type which is believed to be an improvement upon known patented and marketed brakes employed for the same purpose, in that it is more positive in action and is capable of producing a more powerful and more dependable braking action.

An equally important aim is to provide a structure of this class which is in the form of an attachment capable of application to the existing stock parts without requiring alteration of the latter, its construction being such that it can be placed in position for efficient operation by unskilled hands.

The alleged patentable novelty is based upon the especial organization and arrangement of details set forth in the following detailed description and the adjoined claims.

In the drawings:

Figure 1 represents a perspective view showing the improved structure applied to the customary brake drum.

Figure 2 is a group perspective view of certain of the parts.

Referring now to the details by numerals, it will be seen that the reference characters 1 and 2 designate the attaching brackets or hangers. These are of substantially duplicate construction, there being one for the right hand side and one for the left hand side. Each bracket comprises a heavy metal strap 3 of the configuration shown, the same being provided with bolt holes 4 to fasten to existing bolts on the heads at the ends of the rear axle housing. Each bracket is provided at its rear end with a bearing section 5 and in the forward end with a bearing section 6. The bearings are completed by the presence of a removable cap 7.

Front and rear rock shafts 8 and 9 respectively are provided, each shaft being composed of long and short sections 10 and 11 respectively coupled together as at 12. Each section terminates in cranks 13 and are obviously mounted for oscillation in the respective bearings 6 and 5. The forward shaft is provided with a rocker arm 14 with which an operating rod 15 is connected. The operating rod extends forwardly and is connected with the emergency brake lever 16.

The rear shaft is also provided with a rocker arm 17 connected with the first named rocker arm 14 through the medium of a connecting rod 18. The operating and connecting rods are provided with turn buckles or suitable take-up devices. The rocker arms are movably clamped upon the short sections 11 and an anti-rattling spring 19 is provided, if desired.

The end cranks 13 are obviously connected with the brake shoes 20. The brake shoes are of duplicate construction, each one comprising an arcuate plate having a suitable removable brake lining. As shown in Fig. 2 the connection between the shoe and crank is made through the medium of a cast bracket 21 having outstanding spaced parallel apertured ears 22 between which a collar 23 is located. The collar is fastened to the crank through the medium of a set screw 24. The bracket 21 is bolted to the shoe and small coil springs 25 are provided to maintain the shoes in engagement with the braking surface of the drum.

It is obvious that when the operating shaft 15 is manipulated through the medium of the emergency lever, the rock shafts 8 and 9 are simultaneously oscillated in a manner to bring the shoes 20 into braking contact with the friction surfaces of the brake drum.

From the foregoing description and drawings it will be seen that I have evolved an improved brake structure which is characterized by simplicity and inexpensiveness as well as efficiency and durability. It is particularly advantageous in that it is in the form of an attachment capable of application to the existing parts without requiring alterations.

The structure is made especially for use on Ford pleasure cars and trucks. When used on a pleasure car, the front shaft is made comparatively long in order to extend over top of the propeller shaft housing. On trucks, it is made shorter to extend beneath said housing. It is submitted that the improved structure provides a powerful leverage and consequent braking action. Also, the invention has been made to render it advantageous from the standpoint of the manufacturer in that the parts may be conveniently made and assembled. Furthermore, the arrangement is such as to distribute stresses, and to render the structure susceptible to easy operation. These and other advantageous features have doubtless been made apparent. Therefore, more lengthy description is believed to be unnecessary.

Changes in shape, size and rearrangement coming within the scope of the adjoined claims may be resorted to if desired.

I claim:

1. In a vehicle brake structure of the class described, a pair of hanger brackets provided with bearings, a rock shaft mounted for oscillation in said bearings, said rock shaft being formed at its opposite ends with cranks, a pair of brake shoes, each shoe comprising an arcuate plate, a removable lining therefor, a bracket carried by the plate, said bracket being provided with outstanding spaced parallel apertured ears, a portion of the complemental crank extending through said apertures, and a collar located between said ears, surrounding said crank portion, and a set screw carried by said collar and fastened to said crank portion.

2. In a vehicle wheel brake structure of the class described, a pair of substantially duplicate hanger brackets provided with forward and rear bearings, forward and rear rock shafts, each shaft being composed of long and short sections coupled together, the forward rock shaft being journalled for oscillation in the forward bearings, and the rear rock shaft being journalled for oscillation in said rear bearings, the outer ends of said rock shafts being provided with cranks, brake shoes movably mounted on said cranks, rocker arms removably clamped on the short sections of said rock shafts, an operating rod connected with one of the rocker arms, and a connecting rod between said rocker arms for simultaneously oscillating said rock shafts, when said operating rod is manipulated.

In testimony whereof I affix my signature.

HENRY W. LUTES.